Sept. 4, 1951    R. I. LAPPIN ET AL    2,566,843
ADJUSTABLE CRANK DEVICE
Filed March 22, 1950

Inventors
Robert I. Lappin
Louis Zaiger
by Roberts, Cushman & Grover
Attys

Patented Sept. 4, 1951

2,566,843

UNITED STATES PATENT OFFICE 2,566,843

ADJUSTABLE CRANK DEVICE

Robert I. Lappin, Marblehead, and Louis Zaiger, Swampscott, Mass.

Application March 22, 1950, Serial No. 151,122

9 Claims. (Cl. 74—600)

This invention relates to windshield wipers for motor vehicles and more especially to multi-adjustable mechanism for connecting the wiper blade linkage of double wipers to the wiper motor.

At the present time there is a large number of models of double windshield wipers available for use on both private automobiles and trucks and their driving linkages vary from each other in both the spacing and the angularity. This is due in part to the differences in design for different makes of motor vehicles and in part to differences in the angular sweep of the wiper arms. It would be impractical and undesirable to manufacture and keep on hand a large variety of motors to take care of the different makes of wipers, hence some means must be provided to adapt a given wiper motor for all or as many wiper models as possible. Heretofore the problem has been partially solved by providing each wiper motor with a rigid arm, for making the connection between its oscillating shaft and the wiper linkage, which had a plurality of differently spaced pivot pins to which the linkage could selectively be connected according to their spacing. This expedient however is not nearly flexible enough in that each arm was necessarily limited to a relatively small number of differently spaced pins and the provision of a number of such arms for different groups of wipers is unsatisfactory because of the chance of error in selecting the right arm. Moreover almost without fail the particular arm that a customer calls for is not in stock and substitution of another size as a temporary expedient may result in permanent damage to the wiper linkage.

The principal objects of the present invention are to provide an adaptor for use in lieu of the multiple-pin type arm used heretofore which will make it possible to connect the operating linkage of substantially any model wiper to the oscillating shaft of the wiper motor regardless of the lateral spacing of the linkage or the angularity thereof so that by stocking a single kind of connector all wipers may be serviced, which may easily be installed without modifying the wiper mechanism itself, in which the driving force transmitted thereby is constrained to act through the center of rotation of the motor shaft, which is inexpensive to manufacture, has a minimum number of parts, and is durable.

As illustrated, the adaptor consists of an adjustable member in the form of a support adapted to be mounted on the oscillating shaft of the wiper motor for rotation therewith and on which is a pair of diametrically spaced connector elements constructed and arranged to have both linear and angular adjustment thereon. The elements are in the form of connector pins mounted on the support for linear adjustment along a line passing through the center of rotation of the motor shaft to and from the center of rotation, and for angular rotation with respect to the support about the axis of rotation. In a more specific aspect of the invention the support includes a circular plate having a central aperture therein adapted to be non-rotatably engaged with the motor shaft, and having spaced arcuate slots therein at opposite sides of and concentric with the central aperture, a second plate fastened to the circular plate by means of screw-threaded studs extending therefrom through the slots so that the second plate may be angularly adjusted with respect to the circular plate, and pin arms interposed between the plates, one end of each of the arms carrying the connector pins and being so shaped that the connector pins lie diametrically opposite each other at opposite sides of the center of rotation. Guides on the second plate engage the arms and constrain their movement to linear movement along a common diameter and also effect angular movement of the bars with the plate when the latter is twisted with respect to the first plate. As thus constructed, the screw-threaded studs afford means for drawing the plates together to immobilize the pin arms, and the second plate with respect to the first plate following linear and angular adjustment of the parts.

The invention will now be described in greater detail with reference to the accompanying drawings in which.

Figure 1:
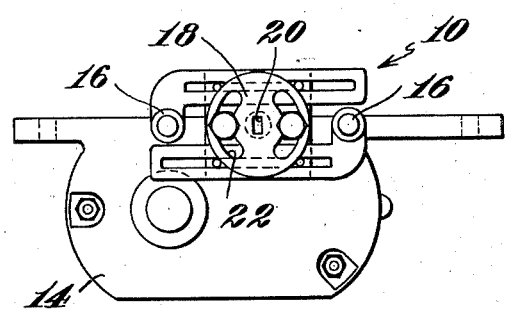
Fig. 1 is an elevation of the end of the motor from which the motor shaft extends with the adaptor applied thereto and shown in plane view.
Figure 7:
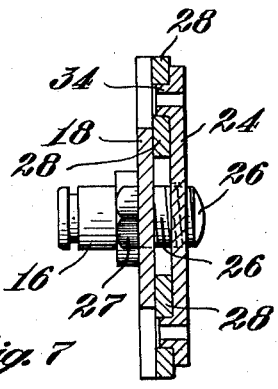
Fig. 7 is a section to larger scale on the line 7—7 of Fig. 4.
Figure 2:
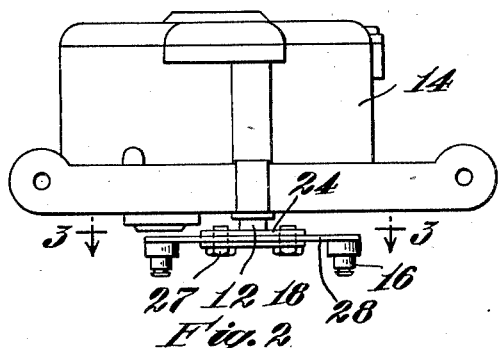
Fig. 2 is a top plan view of the motor as shown in Fig. 1, showing an edge view of the adaptor as applied to the motor shaft.
Figure 3:
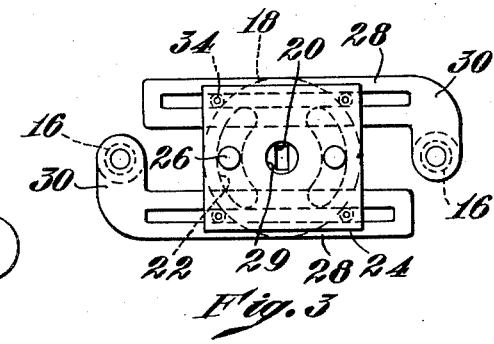
Fig. 3 is a plan view of the adaptor as seen from the rear side thereof taken on the line 3—3 of Fig. 2.
Figure 5:
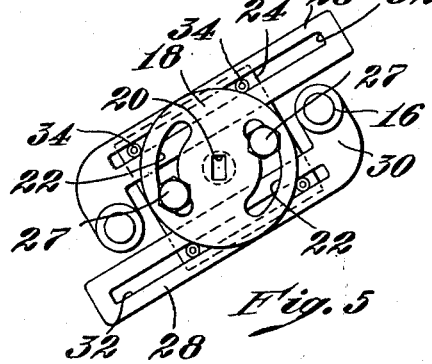
Fig. 5 is a plan view as seen from the front side of the adaptor with its connector elements adjusted angularly with respect to the motor shaft.
Figure 4:
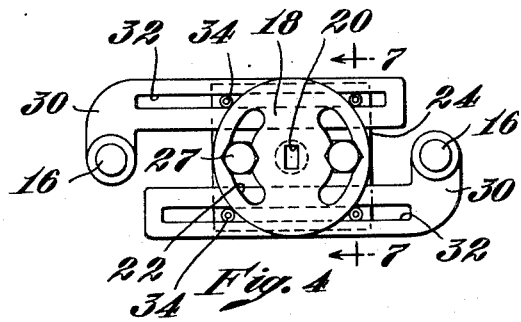
Fig. 4 is a plan view of the adaptor as seen from the front side thereof.
Figure 6:
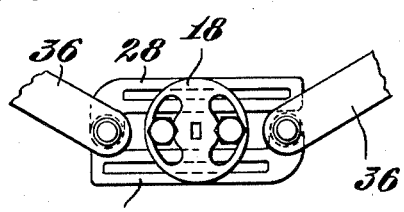
Fig. 6 is a front plan view of the adaptor showing portions of the wiper arm linkage connected to the pin arms of the adaptor.

Referring to the drawings, the adaptor is comprised essentially of a support 10 mounted on the motor shaft 12 of a wiper motor 14 for oscillation therewith and has on it a pair of spaced elements 16 arranged diametrically at opposite sides of the center of rotation of the motor shaft for both linear and angular adjustment with reference to the axis of the motor shaft to change both their spacing and their angularity independently of each other.

As more specifically illustrated, the support 10 comprises a substantially circular plate 18 having a central aperture 20 therein adapted to be non-rotatably engaged with the motor shaft. As illustrated, the aperture 20 is of rectangular configuration which, when engaged with a motor shaft having a corresponding rectangular cross section, will insure oscillation of the plate with the shaft. It is to be understood however that the central aperture may be of different shape and even circular if splines or keys are used in conjunction therewith to fix the plate to the motor shaft for oscillation therewith. The plate 18 has a pair of spaced arcuate slots 22 therethrough at opposite sides of the central aperture, spaced radially thereof and concentric therewith. Mounted on the circular plate 18 between it and the motor housing 14 for angular adjustment with respect thereto about the center of rotation of the motor shaft is a rectangular plate 24 having spaced, threaded studs 26 extending therefrom for engagement within the arcuate slots 22. The studs have heads 27 large enough to overlie the edges of the slots 22. To permit angular rotation of the plate 24 it has a circular aperture 29 at its center large enough to clear the outside diameter of the motor shaft. The length of the arcuate slots 22—22 is such that the plate 24 may be adjusted angularly 45° up or down from the horizontal. Between the plates 18 and 24 there is situated a pair of flat pin arms 28 placed at opposite sides of the central aperture in the plate 18 and parallel to each other, each of which has at one end an elbow 30 extending toward the opposite bar on which is mounted the element 16. The elements 16 are in the form of cylindrical trunnion pins, extending outwardly from the surfaces of the arms, perpendicular to the plane of the plate 18 so that their axes are parallel to the axis of the motor shaft and lie at opposite sides of the axis of rotation of the motor shaft on a common line passing through them and the axis of rotation of the motor shaft. Each of the pin or trunnion arms 28 has an elongate rectangular slot 32 therein into which extend pairs of guide pins or bosses 34—34 fixed to or formed integral with the plate 24. The bosses 34 are arranged near the opposite marginal edges of the plate 24 at opposite sides of the center of rotation thereof and constrain adjustment of the arms 28 to linear movement so that the trunnions 16 move radially to and from the center of rotation along a common diameter.

It is plain by the foregoing construction that the trunnions 16 to which the linkage of the wiper blades is to be attached may be adjusted radially from the center of rotation of the motor shaft independently of each other by movement of the arms 28 between the plates 18 and 24 relative to the plate 24 on the guide pins or bosses 34—34. This construction will permit adjustment of the pins 16—16 to an infinite number of positions within their range of adjustment, thereby to accommodate almost any spacing that may be encountered in different linkages.

To adjust the trunnions for differences in angularity of the linkages the plate 24 is turned relative to the plate 18 and since the pin arms 28 are constrained to move with the plate 24, they will take up the angular positions to which the plate 24 is turned. Since the linkages will be symmetrical in their angular departure from a common diameter through the center of rotation of the axis of the motor shaft, the arms are arranged so that angular movement of the plate 24 moves both arms angularly a corresponding amount.

When the trunnions 16 have been adjusted both as to distance and angularity with respect to the axis of rotation of the driving shaft of the wiper motor, the threaded studs 26 are rotated to draw the plates 18 and 24 together thereby to immobilize the arms 28 and the plates and hence to fix the trunnions in their adjusted positions.

Marks may be provided on the arms 28 indicating proper adjustment thereof for different models of wiper mechanism and hence to facilitate equal spacing thereof from the center of rotation of the device in cases where the linkages are symmetrically spaced with reference to the motor shaft. If the spacing is not symmetrical these marks may be disregarded.

As illustrated the trunnions 16—16 are cylindrical having near their ends circumferential grooves for snap-action engagement with the adjacent ends of the wiper linkage. Any other suitable or conventional connection may, however, be employed.

It is apparent from the foregoing description that the adaptor is of simple, rugged construction, is easily adjustable for various makes and styles of wiper mechanism, minimizes error in making proper adjustments since the pin arms are constrained to move parallel to each other, and in all cases assures transmission of the power from the motor shaft through the center line of the shaft and hence with a minimum of torque. Moreover should the screw studs become loose the entire assembly is constrained to turn about the axis of the motor shaft as a center by virtue of the hole 29 in the plate 24 which closely fits the motor shaft 12. Still another advantage of the foregoing construction lies in the fact that each arm is, in effect, clamped at two points by the two studs so that loosening of the arms due to oscillation and reciprocation is minimized.

It should be understood that the present disclosure is for the purpose of illustration only and that this invention includes all modifications and equivalents which fall within the scope of the appended claims.

We claim:

1. An adaptor for adjustably connecting the driving links of double windshield wiper arms to the wiper motor shaft, comprising a support mounted on the motor shaft for oscillation therewith, a pair of elements on the support adapted to have pivotal connection with the driving links of the wiper arms, means connecting said elements to the support at positions diametrically opposite each other with respect to the axis of rotation of the shaft, said means being movable on the support to effect adjustment of the elements on the support to and from each other along a common diameter to vary their radial distances from the axis of rotation of the shaft, and to effect angularly adjustment in unison on the support about the axis of rotation, and means on the support for locking the connecting means thereto against movement.

2. An adaptor for adjustably connecting the driving links of windshield wiper arms to the wiper motor shaft, comprising a support mounted on the motor shaft for oscillation therewith, a pair of elements on the support adapted to have pivotal connection with the driving links of the wiper arms, said elements being arranged diametrically opposite the axis of rotation of the shaft, being movable linearly and angularly on the support relative to the axis of rotation of the motor shaft, means on the support constraining the linear movement of the elements to movement along a diameter passing through the elements and the axis of rotation of the shaft, means on the support for constraining the angular movement of the elements to rotation about the axis of rotation of the shaft, and means for immobilizing the elements with reference to the support.

3. An adaptor for adjustably connecting the driving links of windshield wiper arms to the wiper motor shaft, comprising a support mounted on the motor shaft for oscillation therewith, a pair of elements on the support adapted to have pivotal connection with the driving links of the wiper arms and being movable linearly and angularly on the support relative to the axis of rotation of the motor shaft, a guide member associated with the support on which the elements are slidably arranged, said guide constraining the linear movement of the elements to movement along a common diameter passing through the axis of rotation, means joining the guide member to the support for angular movement about the axis of rotation of the shaft to effect angular movement of the elements with reference to the shaft, and means for immobilizing the elements on the guide means and the guide means with reference to the support.

4. An adaptor for adjustably connecting the driving links of windshield wiper arms to the wiper motor shaft, comprising a support mounted on the motor shaft for oscillation therewith, a guide plate associated with the support for angular rotation with reference to the support about the axis of the shaft, guides on the guide plate, a pair of elements mounted on the guides between the guide plate and support for sliding movement therebetween, said elements being adapted to be connected to the driving link and being arranged diametrically opposite the axis of rotation of the shaft, said guides being arranged to constrain the elements to linear movement along a diameter passing through the center of rotation, and means for drawing the guide plate and support together against the interposed elements to immobilize movement thereof linearly and of the angular movement of the guide plate on the support.

5. An adaptor for adjustably connecting the driving links of windshield wiper arms to the wiper motor shaft, comprising a support mounted on the motor shaft for oscillation therewith, said support having spaced, arcuate slots therein concentric with the axis of rotation of the shaft, a guide plate, studs extending from the guide plate through the arcuate slots and supporting the guide plate on the support for angular movement relative thereto about the axis of rotation of the shaft, guides on the guide plate, a pair of elements slidably mounted on the guides for movement radially with respect to the center of rotation of the shaft, said elements being diametrically opposed and being adapted to be connected to said links, and said studs being constructed and arranged to draw the guide plate and support together to immobilize the movement of the elements on the guides and movement of the guide plate relative to the support.

6. An adaptor for adjustably connecting the driving links of windshield wiper arms to the wiper motor shaft, comprising a support having an aperture at its center for non-rotatable engagement with the motor shaft, and a pair of spaced, arcuate slots situated radially outward of the central aperture and concentric therewith, a flat guide plate, a pair of threaded studs extending through the arcuate slots and into the guide plate, guides on the guide plate situated at opposite sides of the central aperture, arms mounted for linear sliding movement on the guides between the guide plate and support, each arm having at one end an element adapted to be pivotally connected to one of said driving links, said elements being situated diametrically opposite each other on a common line passing through the center of the support and being adjustable linearly radially of the center, said arcuate slots permitting angular adjustment of the guide plate and hence the elements angularly with respect to the axis of rotation, and said studs being adapted to draw the guide plate and support together to immobilize the interposed arms and relative movement of the support and guide plate.

7. An adaptor for adjustably connecting double wiper linkage to the shaft of a wiper motor, comprising a pair of spaced, parallel plates having a common center of rotation and being angularly rotatable about said common center relative to each other, a pair of elements interposed between the plates, said elements being diametrically opposite said center of rotation, means carried by one of the plates slidably engaging said elements, said means constraining movement of the elements to radial movement along a common diameter passing through said center of rotation, said means effecting angular movement of the elements relative to the other plate when the plates are rotated angularly with respect to each other, and means for drawing the plates together to immobilize both the plates and the elements, said other plate having a central aperture therein adapted non-rotatably to engage the shaft of the wiper motor to effect oscillation thereof of the adaptor.

8. An adaptor for adjustably connecting double wiper linkage to the shaft of a wiper motor, comprising a pair of spaced, parallel plates having a common center of rotation, one of said plates having an aperture at the center thereof for non-rotatable engagement with the oscillating shaft of said motor, and a pair of diametrically spaced, arcuate slots concentric with the central aperture, threaded studs extending from the other plate through the arcuate slots and supporting said other plate for angular rotation with respect to the one plate about said common center, a pair of spaced parallel arms interposed between the plates at opposite sides of said common center, said arms being relatively movable between the plates to change the distance between their opposite ends, means on said other plate constraining the arms to linear movement parallel to each other and effecting angular movement of the arms relative to the one plate when the plates are rotated relative to each other, and a pivot element carried by an end of each arm so as to be situated diametrically opposite the center of rotation, said studs being rotatable to draw the plates together to immobilize the plates and the arms.

9. An adaptor for adjustably connecting double wiper linkage to the shaft of a wiper motor, comprising a pair of spaced, parallel plates having a common center of rotation, both of said plates having apertures at its center of rotation, one of which is adapted non-rotatably to engage the oscillating shaft of said motor, and the other of which has rotatable engagement therewith, said one plate having a pair of diametrically spaced, arcuate slots concentric with its central aperture, threaded studs extending from the other plate through the arcuate slots and supporting said other plate for angular rotation with respect to the one plate about said common center, a pair of spaced, parallel arms interposed between the plates at opposite sides of said common center, said arms being relatively movable between the plates to change the distance between their opposite ends, means on said other plate constraining the arms to linear movement parallel to each other and effecting angular movement of the arms relative to the one plate when the plates are rotated relative to each other, and a pivot element carried by an end of each arm so as to be situated diametrically opposite the center of rotation, said studs being rotatable to draw the plates together to immobilize the plates and the arms.

ROBERT I. LAPPIN.
LOUIS ZAIGER.

REFERENCES CITED

The following references are of record in the file of this patent:

UNITED STATES PATENTS

| Number | Name | Date |
|---|---|---|
| 713,371 | Adams | Nov. 11, 1902 |
| 1,585,923 | Kellogg et al. | May 25, 1926 |
| 2,107,875 | Pitney | Feb. 8, 1938 |